United States Patent
Xu et al.

(10) Patent No.: US 10,970,844 B2
(45) Date of Patent: Apr. 6, 2021

(54) IMAGE SEGMENTATION METHOD AND DEVICE, COMPUTER DEVICE AND NON-VOLATILE STORAGE MEDIUM

(71) Applicant: BOE TECHNOLOGY GROUP CO., LTD., Beijing (CN)

(72) Inventors: Jingtao Xu, Beijing (CN); Jianwen Suo, Beijing (CN); Yue Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 163 days.

(21) Appl. No.: 16/403,805

(22) Filed: May 6, 2019

(65) Prior Publication Data

US 2020/0034972 A1    Jan. 30, 2020

(30) Foreign Application Priority Data

Jul. 25, 2018 (CN) .......................... 2018 1 0823610

(51) Int. Cl.
*G06T 7/11* (2017.01)
*G06T 7/136* (2017.01)
(Continued)

(52) U.S. Cl.
CPC ................ *G06T 7/11* (2017.01); *G06T 7/136* (2017.01); *G06T 7/155* (2017.01); *G06T 7/194* (2017.01);
(Continued)

(58) Field of Classification Search
CPC . G06T 7/11; G06T 7/194; G06T 2207/10004; G06T 7/187; G06T 7/136;
(Continued)

(56) References Cited

U.S. PATENT DOCUMENTS

| 2007/0297657 | A1 | 12/2007 | Mattes et al. | |
|---|---|---|---|---|
| 2012/0070053 | A1* | 3/2012 | Liu | G06T 7/0012 382/131 |
| 2012/0224755 | A1* | 9/2012 | Wu | B33Y 50/00 382/131 |

FOREIGN PATENT DOCUMENTS

| CN | 101710424 A | 5/2010 |
|---|---|---|
| CN | 102005034 A | 4/2011 |

(Continued)

OTHER PUBLICATIONS

Chinese Office Action in Chinese Application No. 201810823610.X, dated Mar. 25, 2020 with English translation.

(Continued)

*Primary Examiner* — Brandon J Miller
(74) *Attorney, Agent, or Firm* — Collard & Roe, P.C.

(57) ABSTRACT

An image segmentation method and device, a computer device and a non-volatile storage medium are provided. The image segmentation method includes: performing super-pixel segmentation on an image to be segmented to obtain a super-pixel image, and binarizing the image to be segmented to obtain a binary image; combining the super-pixel image and the binary image to obtain a binary super-pixel image; performing distance transformation on the binary super-pixel image, to obtain a grayscale super-pixel image; marking seed points in the grayscale super-pixel image, to obtain a seed point super-pixel image in which grayscale values of the seed points are greater than a first value, and grayscale values of pixel blocks other than the seed points in target regions are the first value; and marking and filling the pixel blocks, grayscale values of which are the first value in the seed point super-pixel image, to obtain a segmented image.

19 Claims, 8 Drawing Sheets

(51) Int. Cl.
*G06T 7/194* (2017.01)
*G06T 7/155* (2017.01)

(52) U.S. Cl.
CPC ............. *G06T 2207/10004* (2013.01); *G06T 2207/20152* (2013.01)

(58) Field of Classification Search
CPC . G06T 2207/20041; G06T 2207/20152; G06T 7/155
See application file for complete search history.

(56) References Cited

FOREIGN PATENT DOCUMENTS

| | | | |
|---|---|---|---|
| CN | 102663700 A | 9/2012 | |
| CN | 103164858 A | 6/2013 | |
| CN | 103942808 A | 7/2014 | |
| CN | 105844285 A | 8/2016 | |

OTHER PUBLICATIONS

Zhang et al., "Text Segmentation Based on Superpixel Fusion", Journal of Computer Applications, China Academic Journal Electronic Publishing House, vol. 36, Issue 12, Dec. 10, 2016, pp. 3418-3422 with English Translation (17 pages).

\* cited by examiner

IMAGE SEGMENTATION METHOD AND DEVICE, COMPUTER DEVICE AND NON-VOLATILE STORAGE MEDIUM

The present application claims priority of Chinese Patent Application No. 201810823610.X, filed on Jul. 25, 2018, the disclosure of which is incorporated herein by reference in its entirety as part of the present application.

TECHNICAL FIELD

Embodiments of the present disclosure relate to an image segmentation method and device, a computer device and a non-volatile storage medium.

BACKGROUND

Image segmentation is a technology and process of dividing an image into a plurality of specific regions with unique properties and extracting a target of interest. It is a key step from image processing to image analysis. Existing image segmentation methods mainly include the following categories: a threshold-based segmentation method, a region-based segmentation method, an edge-based segmentation method, a segmentation method based on specific theories, and so on. From a mathematical point of view, image segmentation is a process of dividing a digital image into regions that do not intersect with each other. The process of image segmentation is also a marking process, that is, assigning a same label to pixels which are located at a same region.

SUMMARY

At least one embodiment of the present disclosure provides an image segmentation method, which comprises: performing super-pixel segmentation on an image to be segmented to obtain a super-pixel image comprising at least one pixel block, and binarizing the image to be segmented to obtain a binary image; obtaining a binary super-pixel image according to a ratio of a number of pixel points, grayscale values of which are a first value, to a number of pixel points, grayscale values of which are a second value, in the binary image corresponding to a position, at which each pixel block is located, in the super-pixel image; performing distance transformation on the binary super-pixel image, to obtain a grayscale super-pixel image; marking seed points in the grayscale super-pixel image, to obtain a seed point super-pixel image, wherein grayscale values of the seed points in the seed point super-pixel image are greater than the first value, and grayscale values of pixel blocks other than the seed points in target regions are the first value; and marking and filling the pixel blocks, grayscale values of which are the first value, in the seed point super-pixel image, to obtain a segmented image.

For example, in the image segmentation method provided by some embodiments of the present disclosure, grayscale values of pixel blocks in different target regions of the segmented image are grayscale values of seed points in respective target regions, and boundary pixel blocks between different target regions are marked out in the segmented image.

For example, in the image segmentation method provided by some embodiments of the present disclosure, a grayscale value of a pixel point in a target region of the binary image is the first value, and a grayscale value of a pixel point in a background region of the binary image is the second value.

For example, in the image segmentation method provided by some embodiments of the present disclosure, a grayscale value of a pixel point in a target region of the binary super-pixel image is the first value, and a grayscale value of a pixel point in a background region of the binary super-pixel image is the second value.

For example, in the image segmentation method provided by some embodiments of the present disclosure, the first value is one, and the second value is zero.

For example, in the image segmentation method provided by some embodiments of the present disclosure, performing distance transformation on the binary super-pixel image to obtain the grayscale super-pixel image comprises: setting an initial grayscale image corresponding to positions of pixel blocks in the binary super-pixel image, wherein initial grayscale values of respective pixel blocks in the initial grayscale image are the second value; traversing the respective pixel blocks in the binary super-pixel image, and judging whether or not grayscale value of current pixel block is the second value; if the grayscale value of the current pixel block is not the second value, judging whether or not a grayscale value of at least one pixel block, among pixel blocks adjacent to the current pixel block, is the second value; if the grayscale value of at least one pixel block, among the pixel blocks adjacent to the current pixel block, is the second value, assigning the second value to grayscale value of pixel block, corresponding to the current pixel block, in the initial grayscale image, and adding one to grayscale values of pixel blocks, corresponding to the pixel blocks adjacent to the current pixel block, in the initial grayscale image; and if the grayscale value of the current pixel block is the second value, continuing to traverse, until all the pixel blocks in the binary super-pixel image are traversed, and thus obtaining the grayscale super-pixel image.

For example, in the image segmentation method provided by some embodiments of the present disclosure, marking seed points in the grayscale super-pixel image, to obtain the seed point super-pixel image, comprises: setting an initial seed point image corresponding to positions of pixel blocks in the grayscale super-pixel image, wherein initial grayscale values of pixel blocks of the initial seed point image are the second value; acquiring a maximum value in grayscale values of respective pixel blocks in the grayscale super-pixel image, setting a seed point grayscale threshold, and setting an initial value i to a retrieve grayscale value, where i is an integer greater than or equal to the first value; executing a marking step comprising: starting traversing from a pixel block, a grayscale value of which is the retrieve grayscale value in the grayscale super-pixel image, and judging whether or not a sum of grayscale values of pixel blocks within an N-neighborhood of the current pixel block in the grayscale super-pixel image is the second value; if the sum of the grayscale values of the pixel blocks within the N-neighborhood of the current pixel block in the grayscale super-pixel image is the second value, assigning the second value to a grayscale value of a pixel block, corresponding to the current pixel block of the grayscale super-pixel image, in the initial seed point image; if the sum of the grayscale values of the pixel blocks within the N-neighborhood of the current pixel block in the grayscale super-pixel image is not the second value, judging whether or not the sum of the grayscale values of the pixel blocks within the N-neighborhood of the current pixel block is greater than or equal to the seed point grayscale threshold; if the sum of the grayscale values of the pixel blocks within the N-neighborhood of the current pixel block is greater than or equal to the seed point grayscale threshold, taking the pixel block, corresponding to the current pixel block of the grayscale super-pixel image, in the initial seed point image as a seed point and assigning a grayscale value of the current pixel block to a grayscale value of the seed point; if the sum of the grayscale values of the pixel blocks within the N-neighborhood of the current pixel block is not greater than or equal to the seed point grayscale threshold, assigning the first value to the grayscale value of the pixel block, corresponding to the current pixel block of the grayscale super-pixel image, in the initial seed point image; adding one to the retrieve grayscale value, continuing to execute the marking step, until the retrieve grayscale value is greater than the maximum value in the grayscale values of the respective pixel blocks in the grayscale super-pixel image, and thus obtaining the seed point super-pixel image; and the N-neighborhood is a neighborhood comprises pixel blocks, adjacent to the current pixel block, and pixel blocks, separated from the current pixel block by 1 to N−1 pixel blocks, and N is an integer greater than or equal to 2.

For example, the image segmentation method provided by some embodiments of the present disclosure, before marking and filling the pixel blocks, the grayscale value of which are the first value in the seed point super-pixel image, to obtain the segmented image, further comprising: merging seed points close to each other in the seed point super-pixel image, and updating the seed point super-pixel image.

For example, in the image segmentation method provided by some embodiments of the present disclosure, merging the seed points close to each other in the seed point super-pixel image, and updating the seed point super-pixel image comprises: traversing respective seed points in the seed point super-pixel image, and judging whether or not an N-neighborhood of a current seed point comprises another at least one seed point; if the N-neighborhood of the current seed point comprises another at least one seed point, taking a pixel block at a relatively middle position between the current seed point and the another at least one seed point as a new seed point, assigning a grayscale value of the current seed point to a grayscale value of the new seed point, assigning the first value to the grayscale value of the current seed point and the grayscale value of the another at least one seed point, and thus updating the seed point super-pixel image; and if the N-neighborhood of the current seed point comprises no other at least one seed point, not updating the seed point super-pixel image.

For example, in the image segmentation method provided by some embodiments of the present disclosure, marking and filling the pixel blocks, grayscale values of which are the first value, in the seed point super-pixel image, to obtain the segmented image, comprises: traversing respective pixel blocks, grayscale values of which are the first value, in the seed point super-pixel image, and judging whether or not the N-neighborhood of the current pixel block comprises one seed point; if the N-neighborhood of the current pixel block comprises one seed point, assigning a grayscale value of the seed point to the grayscale value of the current pixel block, to implement filling; if the N-neighborhood of the current pixel block comprises more than one seed point, in a case where the N-neighborhood of the current pixel block comprises a plurality of seed points, marking the current pixel block as a boundary pixel block between the different target regions; and obtaining the segmented image, after traversing all the pixel blocks, grayscale values of which are the first value, in the seed point super-pixel image.

For example, the image segmentation method provided by some embodiments of the present disclosure, after marking and filling the pixel blocks, grayscale values of which are the first value, in the seed point super-pixel image, to obtain the segmented image, further comprising: marking a boundary line; and the boundary line comprises pixel points at a relatively middle position in a boundary region comprising the boundary pixel block, and the boundary line is perpendicular to a connection line between seed points of adjacent target regions.

For example, in the image segmentation method provided by some embodiments of the present disclosure, obtaining the binary super-pixel image according to the ratio of the number of pixel points, the grayscale values of which are the first value, to the number of pixel points, the grayscale value of which are the second value, in the binary image corresponding to the position, at which each pixel block is located, in the super-pixel image, comprises: traversing the respective pixel blocks in the super-pixel image, and judging whether or not the ratio of the number of pixel points, grayscale values of which are the first value, to the number of pixel points, grayscale values of which are the second value, in the binary image corresponding to a position, at which the current pixel block is located, in the super-pixel image, is greater than or equal to one; if the ratio of the number of the pixel points, the grayscale values of which are the first value, to the number of the pixel points, the grayscale values of which are the second value, in the binary image corresponding to the position, at which the current pixel block is located, in the super-pixel image, is greater than or equal to one, assigning the first value to grayscale value of the current pixel block; if the ratio of the number of pixel points, grayscale values of which are the first value, to the number of pixel points, grayscale values of which are the second value, in the binary image corresponding to the position, at which the current pixel block is located, in the super-pixel image, is not greater than or equal to one, assigning the second value to the grayscale value of the current pixel block; and traversing all the pixel blocks in the super-pixel image, and thus obtaining the binary super-pixel image.

At least one embodiment of the present disclosure also provides a n image segmentation device, comprising a super-pixel image generation unit, a binary image generation unit, a binary super-pixel image generation unit, a grayscale super-pixel image generation unit, a seed point super-pixel image generation unit and a segmented image generation unit. A super-pixel image generation unit is configured to perform super-pixel segmentation on an image to be segmented to obtain a super-pixel image comprising at least one pixel block; a binary image generation unit is configured to binarize the image to be segmented to obtain a binary image; a binary super-pixel image generation unit is configured to obtain a binary super-pixel image according to a ratio of the number of pixel points, grayscale values of which are a first value, to the number of pixel points, grayscale values of which is a second value, in the binary image corresponding to a position of each pixel block in the super-pixel image; a grayscale super-pixel image generation unit is configured to perform distance transformation on the binary super-pixel image, to obtain a grayscale super-pixel image; a seed point super-pixel image generation unit is configured to mark seed points in the grayscale super-pixel image, to obtain a seed point super-pixel image, grayscale values of the seed points of which are greater than the first value, and grayscale values of pixel blocks other than the seed points in target regions is the first value; and a segmented image generation unit is configured to mark and fill the pixel blocks, grayscale values of which are the first value in the seed point super-pixel image, to obtain a segmented image.

For example, in the image segmentation device provided by some embodiments of the present disclosure, grayscale values of pixel blocks in different target regions of the segmented image are grayscale values of seed points in respective target regions, and boundary pixel blocks between different target regions are marked out in the segmented image.

For example, in the image segmentation device provided by some embodiments of the present disclosure, a grayscale value of a pixel point in a target region of the binary image is the first value, and a grayscale value of a pixel point in a background region of the binary image is the second value.

For example, in the image segmentation device provided by some embodiments of the present disclosure, a grayscale value of a pixel point in a target region of the binary super-pixel image is the first value, and a grayscale value of a pixel point in a background region of the binary super-pixel image is the second value.

For example, in the image segmentation device provided by some embodiments of the present disclosure, the first value is one, and the second value is zero.

At least one embodiment of the present disclosure also provides an image segmentation device, comprising a processor; a memory, stored one or more computer program modules. The one or more computer program modules are configured to be executed by the processor, and the one or more computer program modules comprise instructions for executing the image segmentation method provided by any one of the embodiments of the present disclosure.

At least one embodiment of the present disclosure also provides a non-volatile storage medium, for storing a non-transitory computer readable instruction, and executing the image segmentation method provided by any one of the embodiments of the present disclosure in a case where the non-transitory computer readable instruction is executed by a computer.

BRIEF DESCRIPTION OF THE DRAWINGS

In order to clearly illustrate the technical solution of the embodiments of the present disclosure, the drawings of the embodiments will be briefly described in the following; and it is obvious that the described drawings are only related to some embodiments of the present disclosure and thus are not limitative of the present disclosure.

DETAILED DESCRIPTION

Figure 1A:
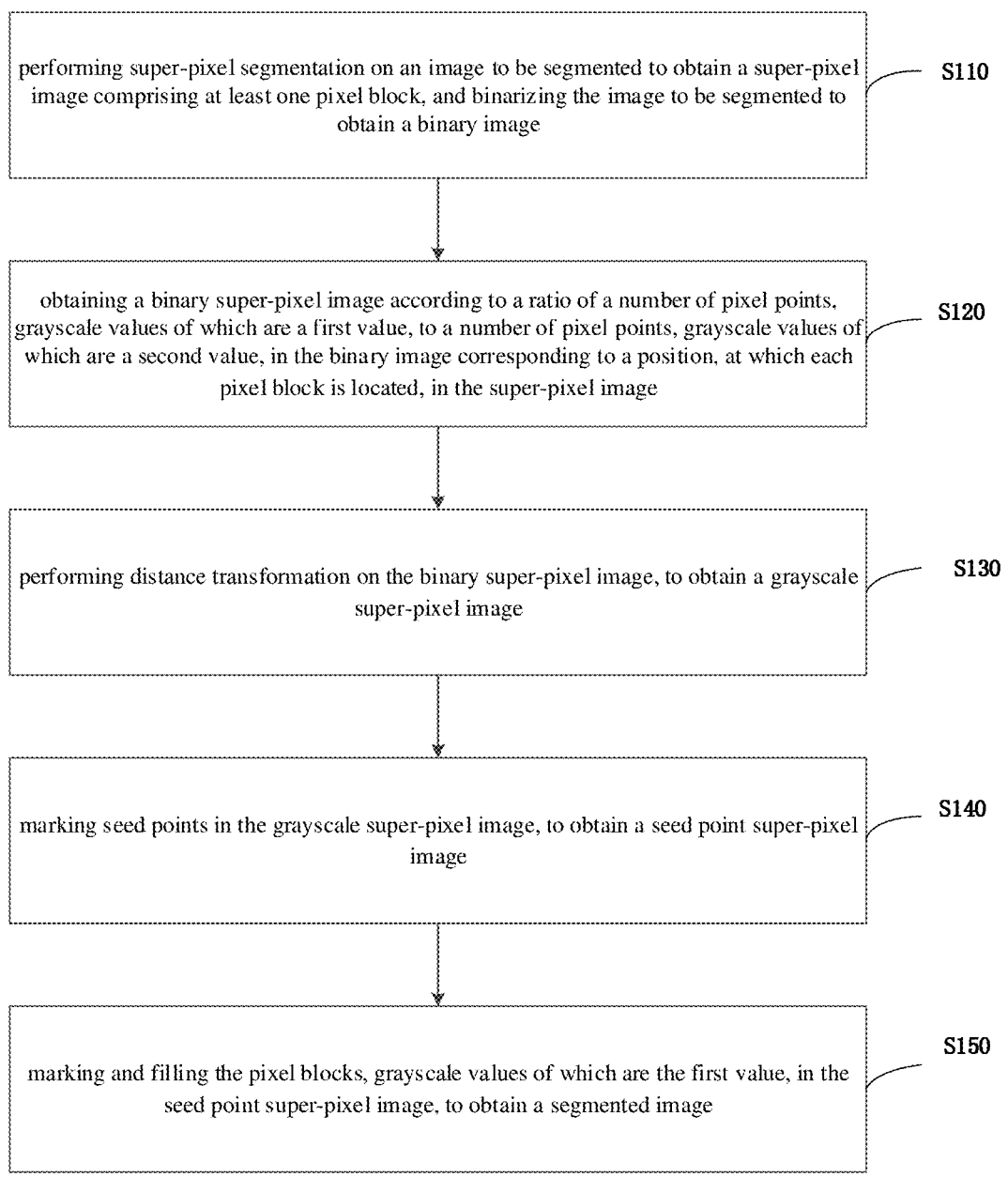
FIG. 1A is a flow chart of an image segmentation method provided by at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

With respect to an image including mutually adhered targets, some image segmentation methods include an erosion and dilation method, a geodesic reconstruction method, a watershed algorithm, and so on.

For example, the erosion and dilation method is mainly used for processing a particle-agglomerated binary image. For example, a target image is processed by performing a binary erosion algorithm until a clear target is obtained, then an object other than the target is removed, and the obtained target is reprocessed by performing a dilation algorithm, so that a restored particle can be obtained; and if the particle-agglomerated binary image is taken as a window, a corresponding target region may be obtained from an original image.

For example, the geodesic reconstruction method has an extremely obvious effect on processing a connected image. For example, an image processing algorithm is reconstructed by introducing several important concepts in geodesic morphology, and the reconstructed image processing algorithm is more efficient than the two algorithms used in the erosion and dilation method.

For example, in the watershed algorithm, geodesic morphological transformation is actually performed on a grayscale image. For example, a grayscale image, an edge of which has been enhanced, is approximated to a geological map by performing the watershed algorithm, for example, a geographic height in the geological map may be represented by a pixel luminance value. For example, a mountain in the geological map is described with an image edge and boundary; while a trough and a basin in the geological map are described with an image background (or a target region).

The above-described three types of image segmentation methods all evolve from mathematical morphology, and thus have an advantage of being easy to implement. However, due to a limitation of the binary image, with respect to an image with a relatively serious adhesion phenomenon, a more serious phenomenon of under-segmentation or over-segmentation will occur to all the three types of image segmentation methods, which results in lower accuracy and lower efficiency of image segmentation.

At least one embodiment of the present disclosure provides an image segmentation method, including: performing super-pixel segmentation on an image to be segmented to obtain a super-pixel image including at least one pixel block, and binarizing the image to be segmented to obtain a binary image; obtaining a binary super-pixel image according to a ratio of a number of pixel points, grayscale values of which are a first value, to a number of pixel points, grayscale values of which are a second value, in the binary image corresponding to a position of each pixel block in the super-pixel image; performing distance transformation on the binary super-pixel image, to obtain a grayscale super-pixel image; marking seed points in the grayscale super-pixel image, to obtain a seed point super-pixel image, in which the grayscale values of seed points in the seed point super-pixel image are greater than the first value, and grayscale values of pixel blocks other than the seed points in target regions are the first value; and marking and filling the pixel blocks, grayscale values of which are the first value in the seed point super-pixel image, to obtain a segmented image.

At least one embodiment of the present disclosure further provides an image segmentation device, a computer device and a non-volatile computer readable storage medium corresponding to the above-described image segmentation method.

In the image segmentation method provided by the above-described embodiments of the present disclosure, on the one hand, contour curves of respective mutually adhered targets in the image can be effectively located, to implement complete segmentation without under-segmentation and over-segmentation, so as to improve accuracy of image segmentation; on the other hand, the image segmentation method provided by some embodiments of the present disclosure is used in combination with a super-pixel image segmentation algorithm, and pre-segmentation is performed by using the super-pixel image segmentation algorithm, which effectively improves image segmentation efficiency; and therefore, the image segmentation method may implement image segmentation accurately and efficiently, which is applicable to segmentation for various images including mutually adhered targets, for example, applicable to segmentation for an image of adhered and overlapping cells, or an image of crowded people, and other images of various scenes including mutually adhered targets of a same type.

In order to explain the present disclosure more clearly, the present disclosure is further described below through some embodiments and the accompanying drawings. Similar components in the drawings are denoted by same reference signs. It should be understood by those skilled in the art that the contents specifically described below are illustrative rather than limitative, which should not limit the scope of the present disclosure.

As shown in FIG. 1A, at least one embodiment of the present disclosure provides a flow chart of an image segmentation method. For example, the image segmentation method is applicable to an image segmentation field, such as an image of adhered and overlapping cells, an image of crowded people, and other scenes, which will not be limited in the embodiment of the present disclosure. The image segmentation method may be implemented by software, loaded and executed by a processor, for example, loaded and executed by a Central Processing Unit (CPU); or, at least partially implemented by software, hardware, firmware, or any combination thereof, which may improve accuracy of image segmentation.

Hereinafter, an image segmentation method provided by at least one embodiment of the present disclosure are explained with reference to FIG. 1A. As shown in FIG. 1A, the image segmentation method includes step S110 to step S150, and hereinafter step S110 to step S150 of the image segmentation method as well as their respective exemplary implementation modes will be respectively introduced.

Step S110: performing super-pixel segmentation on an image to be segmented to obtain a super-pixel image including at least one pixel block, and binarizing the image to be segmented to obtain a binary image.

For example, a grayscale value of a pixel point in a target region of the binary image is a first value, and a grayscale value of a pixel point in a background region of the binary image is a second value. For example, in some embodiments of the present disclosure, a first value is one and a second value is zero, which is taken as an example to be described, but will not be limited to this case in the embodiment of the present disclosure, and embodiments below have the same case, which will not be repeated.

For example, super-pixel segmentation performs a process of classifying pixel points according to a degree of similarity of features, such as texture, color and grayscale, of the pixel points, and taking each type of pixels as a pixel block (or a super-pixel block) in subsequent processing, which may significantly reduce computational complexity of the image processing method in a subsequent process.

It should be noted that, methods in the art may be used in super-pixel segmentation and image binarization, which will not be repeated here.

For example, a super-pixel generation unit for acquiring the super-pixel image and a binary image generation unit for acquiring the binary image may be provided; super-pixel segmentation may be performed by the super-pixel generation unit on the image to be segmented, and binarization may be performed by the binary image generation unit on the image to be segmented; for example, the super-pixel generation unit and the binary image generation unit may be implemented by a central processing unit (CPU), a graphics processing unit (GPU), a tensor processing unit (TPU), a field programmable gate array (FPGA) or other form of processing unit having a data processing capability and/or an instruct execution capability, as well as a corresponding computer instruction. For example, the processing unit may be a general purpose processor or a special purpose processor, which may be a processor based on an X86 or ARM architecture, and the like.

Step S120: obtaining a binary super-pixel image, according to a ratio of a number of pixel points, grayscale values of which are the first value, to a number of pixel points, grayscale values of which are the second value, in the binary image corresponding to a position at which each pixel block in the super-pixel image is located.

For example, a grayscale value of a pixel point in a target region of the binary super-pixel image is the first value, and a grayscale value of a pixel point in a background region of the binary super-pixel image is the second value.

Step S130: performing distance transformation on the binary super-pixel image to obtain a grayscale super-pixel image.

For example, the grayscale super-pixel image has a uniform gradient.

Step S140: marking seed points in the grayscale super-pixel image, to obtain a seed point super-pixel image.

For example, in the seed point super-pixel image, grayscale values of the seed points are greater than the first value, and grayscale values of pixel blocks other than the seed points in target regions are the first value.

Step S150: marking and filling the pixel blocks, grayscale values of which are the first value, in the seed point super-pixel image, to obtain a segmented image.

For example, grayscale values of pixel blocks in different target regions in the segmented image are grayscale values of seed points in respective target regions, and boundary pixel blocks between different target regions are marked out in the segmented image.

In the image segmentation method provided by some embodiments of the present disclosure, on the one hand, contour curves of respective mutually adhered targets in the image can be effectively located, to implement complete segmentation without under-segmentation and over-segmentation, so as to improve accuracy of image segmentation; on the other hand, the image segmentation method provided by some embodiments of the present disclosure is used in combination with a super-pixel image segmentation algorithm, and pre-segmentation is performed by using the super-pixel image segmentation algorithm, which effectively improves image segmentation efficiency; and therefore, the image segmentation method may implement image segmentation accurately and efficiently, which is applicable to segmentation for various images including mutually adhered targets, for example, applicable to segmentation for an image of adhered and overlapping cells, or an image of crowded people, and other images of various scenes including mutually adhered targets of a same type.

Figure 2:
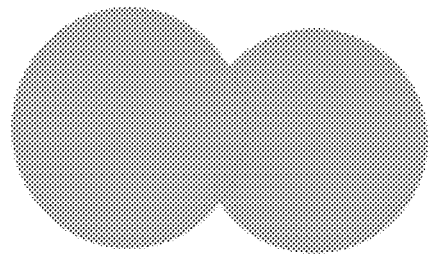
FIG. 2 is a schematic diagram of an example of an image to be segmented provided by at least one embodiment of the present disclosure.
Figure 3:
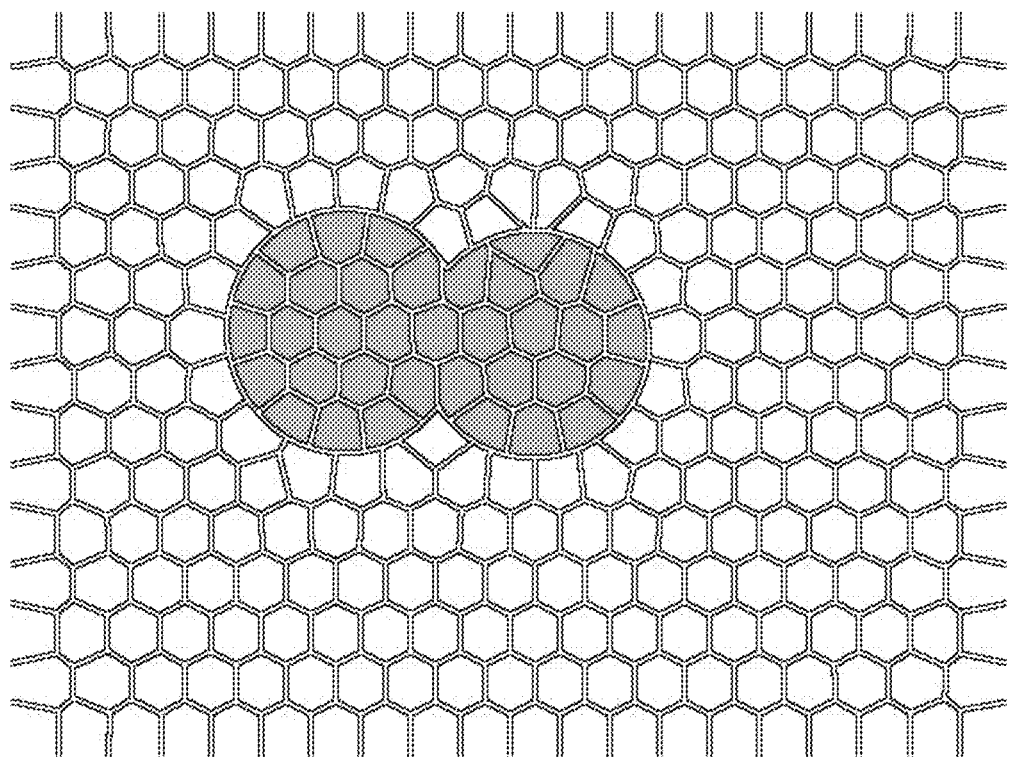
FIG. 3 is a schematic diagram of an example of a super-pixel image provided by at least one embodiment of the present disclosure.
Figure 4:
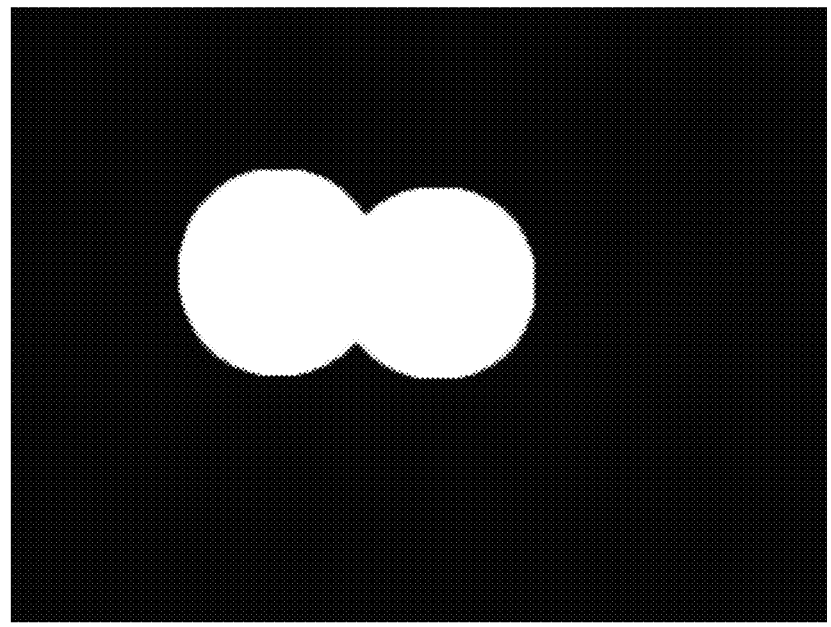
FIG. 4 is a schematic diagram of an example of a binary image provided by at least one embodiment of the present disclosure.

For example, an image to be segmented including two mutually adhered targets as shown in FIG. 2 is taken as an example, a super-pixel image obtained by performing super-pixel segmentation on the image to be segmented is as shown in FIG. 3, and a binary image, grayscale values of pixel points in global target regions of which are one and grayscale values of pixel points of background regions of which are zero, obtained by performing the binarization on the image to be segmented is as shown in FIG. 4.

With respect to step S120, for example, in some implementation modes of some embodiments of the present disclosure, obtaining the binary super-pixel image, grayscale values of pixel blocks in target regions of which are one and grayscale values of pixel blocks in background regions of which are zero, according to the ratio of the number of pixel points, whose grayscale values are one, to the number of pixel points, whose grayscale values are zero, in the binary image corresponding to the position at which each pixel block in the super-pixel image is located, may include the following steps.

Firstly, the respective pixel blocks in the super-pixel image are traversed, and whether or not the ratio of the number of pixel points, whose grayscale values are one, to the number of pixel points, whose grayscale values are zero, in the binary image corresponding to the position, at which each pixel block (for example, current pixel block) in the super-pixel image is located, is greater than one, is judged.

If yes, that is, the number of pixel points, whose grayscale values are one, is greater than or equal to the number of pixel points, whose grayscale values are zero in the binary image corresponding to a position at which the current pixel block is located, and the grayscale value of the current pixel block is assigned to one; if no, that is, the number of the pixel points, whose grayscale values are one is less than the number of the pixel points, whose grayscale values are zero, in the binary image corresponding to the position at which the current pixel block is located, and the grayscale value of the current pixel block is assigned to zero.

All the pixel blocks in the super-pixel image is traversed, and the binary super-pixel image, including pixel blocks, whose grayscale values are one, in the target region, and the pixel blocks, whose grayscale values are zero, in the background regions, according to the respective pixel blocks whose grayscale values have been assigned, is obtained.

Figure 5:
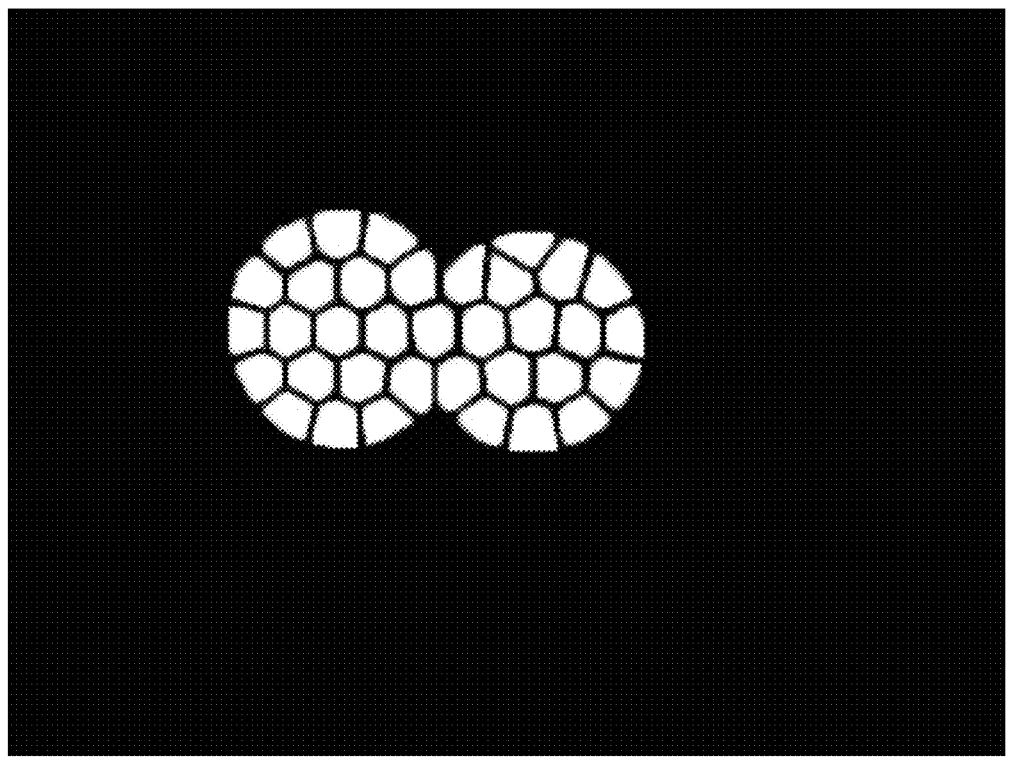
FIG. 5 is a schematic diagram of an example of a binary super-pixel image provided by at least one embodiment of the present disclosure.

For example, the binary super-pixel image including the pixel blocks, whose grayscale values are one, in the target regions, and the pixel blocks, whose grayscale values are zero, in the background regions, obtained according to the ratio of the number of pixel points, whose grayscale values are one, to the number of pixel points, whose grayscale values are zero, in the binary image as shown in FIG. 4 corresponding to the position, at which each pixel block in the super-pixel image as shown in FIG. 3 is located, is as shown in FIG. 5.

For example, a binary super-pixel image generation unit for acquiring the binary super-pixel image may be provided, and the binary super-pixel image is obtained by the binary super-pixel image generation unit according to the ratio of the number of pixel points, whose grayscale values are the first value, to the number of pixel points, whose grayscale values are the second value, in the binary image corresponding to the position at which each pixel block in the super-pixel image is located; for example, the binary super-pixel image generation unit may be implemented by a central processing unit (CPU), a graphics processing unit (GPU), a tensor processing unit (TPU), a field programmable gate array (FPGA) or other form of processing unit having a data processing capability and/or an instruct execution capability, as well as a corresponding computer instruction.

Figure 1B:
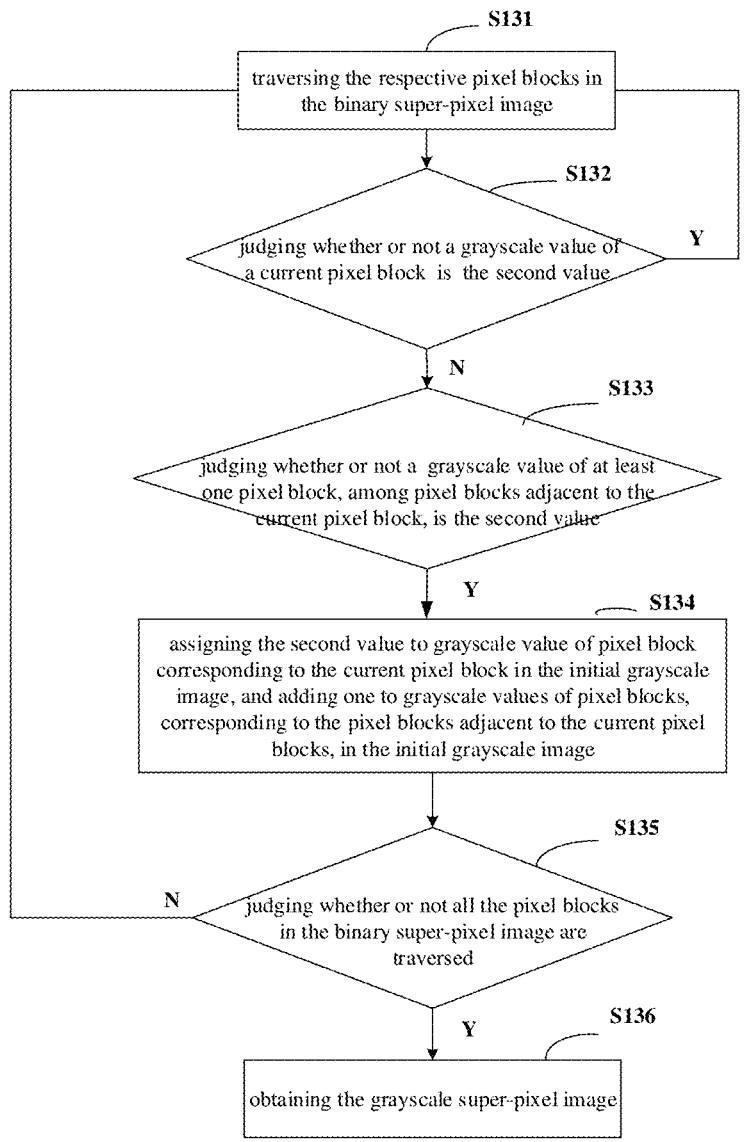
FIG. 1B is a flow chart of at least one example of step S130 as shown in FIG. 1A.

With respect to step S130, for example, in some examples of some embodiments of the present disclosure, performing distance transformation on the binary super-pixel image to obtain the grayscale super-pixel image with a uniform gradient, may include the respective steps as shown in FIG. 1B. That is to say, FIG. 1B is a flow chart of one example of step S130 as shown in FIG. 1A. For example, in the example as shown in FIG. 1B, the method of acquiring the grayscale super-pixel image includes step S131 to step S136. Hereinafter, the image segmentation method provided by the embodiment of the present disclosure are described in detail with reference to FIG. 1B.

Step S131: traversing the respective pixel blocks in the binary super-pixel image.

For example, before the respective pixel blocks in the binary super-pixel image are traversed, an initial grayscale image corresponding to positions of the pixel blocks in the binary super-pixel image is set, and initial grayscale values of respective pixel blocks in the initial grayscale image are zero.

Step S132: judging whether or not a grayscale value of a current pixel block is the second value; if the grayscale value of the current pixel block is not the second value, executing step S133; if the grayscale value of the current pixel block is the second value, executing step S131.

Step S133: judging whether or not a grayscale value of at least one pixel block, among pixel blocks adjacent to the current pixel block, is the second value; if the grayscale value of at least one pixel block, among pixel blocks adjacent to the current pixel block, is the second value, executing step S134; if the grayscale value of at least one pixel block, among pixel blocks adjacent to the current pixel block, is not the second value, executing step S135.

Step S134: assigning the second value to grayscale value of pixel block corresponding to the current pixel block in the initial grayscale image, and adding one to grayscale values of pixel blocks, corresponding to the pixel blocks adjacent to the current pixel blocks, in the initial grayscale image.

For example, if a grayscale value of a current pixel block is non-zero and there is at least one pixel block whose grayscale value is zero among pixel blocks adjacent to the current pixel block (e.g., in a four-neighborhood of the current pixel block), which indicates that the current pixel block is located at an edge of the global target regions, then zero is assigned to the grayscale value of the pixel block corresponding to the current pixel block in the grayscale super-pixel image, then one is added to the grayscale values of the pixel blocks corresponding to the pixel blocks, whose grayscale values are non-zero, among the pixel blocks adjacent to the current pixel block, in the grayscale super-pixel image.

Step S135: judging whether or not all the pixel blocks in the binary super-pixel image are traversed; if all the pixel blocks in the binary super-pixel image are traversed, executing step S136; if all the pixel blocks in the binary super-pixel image are not traversed, executing step S131.

For example, after step S134 is executed, traversing is continued until all the pixel blocks in the binary super-pixel image are traversed, so as to obtain the grayscale super-pixel image.

Step S136: obtaining the grayscale super-pixel image.

After all the pixel blocks in the binary super-pixel image are traversed, the grayscale super-pixel image with a uniform gradient is obtained.

In the implementation mode, the grayscale super-pixel image with a uniform gradient, having the respective target regions, whose grayscale values of a center region to an edge region are gradually reduced, can be obtained accurately and efficiently.

Figure 6:
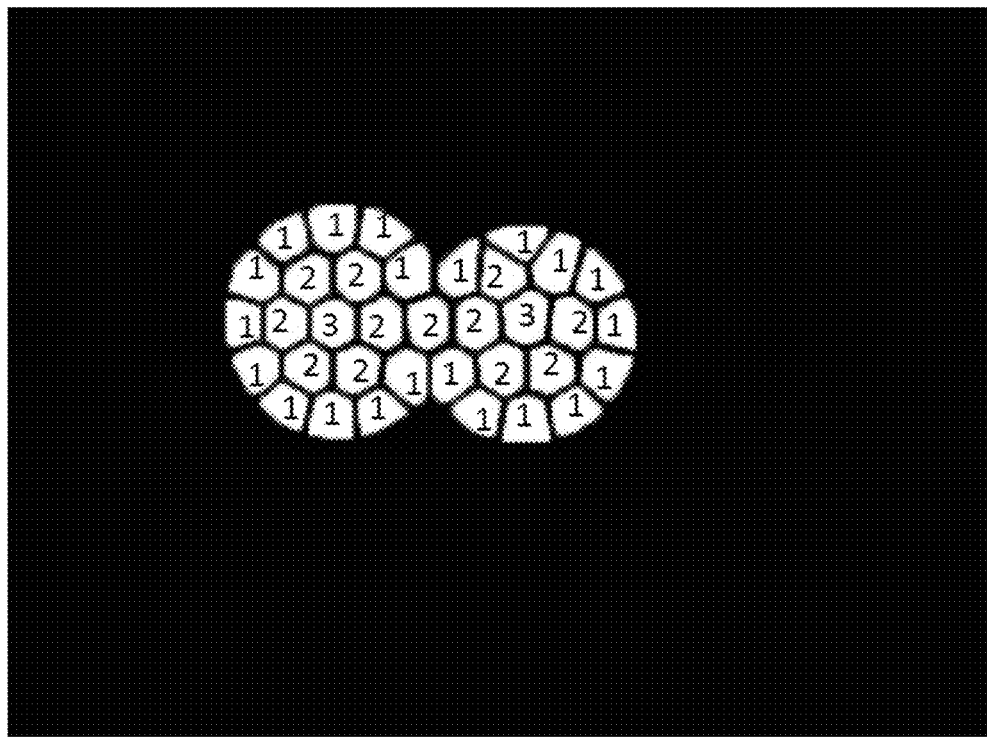
FIG. 6 is a schematic diagram of an example of a grayscale super-pixel image provided by at least one embodiment of the present disclosure.

For example, distance transformation is performed on the binary super-pixel image as shown in FIG. 5, to obtain a grayscale super-pixel image with a uniform gradient as shown in FIG. 6; and in FIG. 6, FIGS. 1, 2 and 3 respectively represent the grayscale values of the pixel blocks.

For example, a grayscale super-pixel image generation unit for acquiring the grayscale super-pixel image may be provided, and distance transformation is performed by the grayscale super-pixel image generation unit on the binary super-pixel image to obtain the grayscale super-pixel image; for example, the grayscale super-pixel image generation unit may be implemented by a central processing unit (CPU), a graphics processing unit (GPU), a tensor processing unit (TPU), a field programmable gate array (FPGA) or other form of processing unit having a data processing capability and/or an instruct execution capability, as well as a corresponding computer instruction.

Figure 1C:
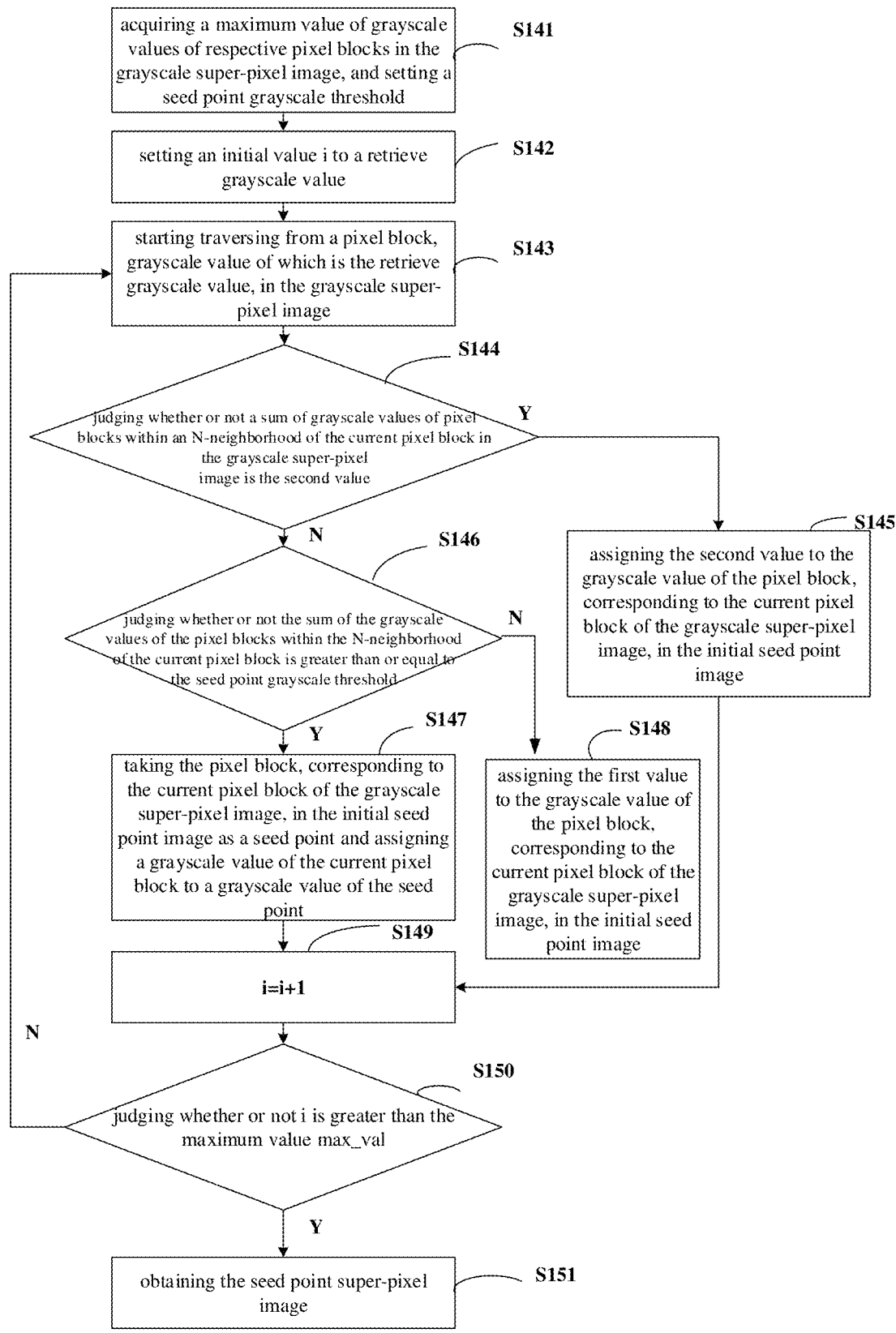
FIG. 1C is a flow chart of at least one example of step S140 as shown in FIG. 1A.

With respect to step S140, in some implementation modes of some embodiments of the present disclosure, marking seed points in the grayscale super-pixel image, to obtain a seed point super-pixel image in which the seed points have grayscale values greater than one and grayscale values of pixel blocks other than the seed points in respective target regions are one, may include the respective steps as shown in FIG. 1C. That is to say, FIG. 1C is a flow chart of an example of step S140 as shown in FIG. 1A. For example, in the example as shown in FIG. 1C, the method of acquiring the seed point super-pixel image includes step S141 to step S151. Hereinafter, the image segmentation method provided by the embodiment of the present disclosure are described in detail with reference to FIG. 1C.

Step S141: acquiring a maximum value of grayscale values of respective pixel blocks in the grayscale super-pixel image, and setting a seed point grayscale threshold.

For example, before step S141, an initial seed point image, corresponding to positions of the pixel blocks in the grayscale super-pixel image, is set, and initial grayscale values of pixel blocks of the initial seed point image are zero.

For example, the maximum value of the grayscale values of the pixel blocks in the grayscale super-pixel image is denoted as max_val. For example, the seed point grayscale threshold may be set according to experience, or may also be analyzed according to specific situations, which will not be limited in the embodiment of the present disclosure.

Step S142: setting an initial value i to a retrieve grayscale value.

Here, i denotes a step length, and may be, for example, an integer greater than or equal to the first value. For example, the initial value i is equal to one, which is taken as an example to be described in the following.

Step S143: starting traversing from a pixel block, grayscale value of which is the retrieve grayscale value, in the grayscale super-pixel image.

For example, traversing is started from a pixel block whose grayscale value is one in the grayscale super-pixel image.

Step S144: judging whether or not a sum of grayscale values of pixel blocks within an N-neighborhood of the current pixel block in the grayscale super-pixel image is the second value; if the sum of the grayscale values of the pixel blocks within the N-neighborhood of the current pixel block in the grayscale super-pixel image is the second value, executing step S145; if the sum of the grayscale values of the pixel blocks within the N-neighborhood of the current pixel block in the grayscale super-pixel image is not the second value, executing step S146.

Step S145: assigning the second value to the grayscale value of the pixel block, corresponding to the current pixel block of the grayscale super-pixel image, in the initial seed point image.

For example, zero is assigned to the grayscale value of the pixel block, corresponding to the current pixel block of the grayscale super-pixel image, in the initial seed point image.

Step S146: judging whether or not the sum of the grayscale values of the pixel blocks within the N-neighborhood of the current pixel block is greater than or equal to the seed point grayscale threshold; if the sum of the grayscale values of the pixel blocks within the N-neighborhood of the current pixel block is greater than or equal to the seed point grayscale threshold, executing step S147; if the sum of the grayscale values of the pixel blocks within the N-neighborhood of the current pixel block is not greater than or equal to the seed point grayscale threshold, executing step S148.

With respect to step S144 to step S146, for example, if the sum of the grayscale values of the pixel blocks within the N-neighborhood (for example, an eight-neighborhood) of the current pixel block is zero, zero is assigned to the grayscale value of the pixel block, corresponding to the current pixel block, in the seed point super-pixel image; if the sum of the grayscale values of the pixel blocks within the N-neighborhood of the current pixel block is non-zero, whether or not the sum of the grayscale values of the pixel blocks within the N-neighborhood of the current pixel block is greater than or equal to the seed point grayscale threshold is judged, if yes, the pixel block corresponding to the current pixel block in the seed point super-pixel image is taken as a seed point, and the grayscale value of the current pixel block is assigned to the grayscale value thereof, if no, one is assigned to the grayscale value of the pixel block corresponding to the current pixel block in the seed point super-pixel image. For example, the N-neighborhood is a neighborhood comprises pixel blocks adjacent to the current pixel block, and pixel blocks separated from the current pixel block by 1 to N−1 pixel blocks, for example, a 2-neighborhood is a neighborhood comprises pixel blocks adjacent to the current pixel block and pixel blocks separated from the current pixel block by one pixel block, and a 3-neighborhood is a neighborhood comprises pixel blocks adjacent to the current pixel block and pixel blocks separated from the current pixel block by one pixel block and by 2 pixel blocks.

Step S147: taking the pixel block, corresponding to the current pixel block of the grayscale super-pixel image, in the initial seed point image as a seed point and assigning a grayscale value of the current pixel block to a grayscale value of the seed point.

Step S148: assigning the first value to the grayscale value of the pixel block, corresponding to the current pixel block of the grayscale super-pixel image, in the initial seed point image.

Step S149: adding one to the retrieve grayscale value.

For example, i+1 is reassigned to the retrieve grayscale value i.

Step S150: judging whether or not i is greater than the maximum value max_val.

For example, whether or not i is greater than the maximum value max_val is judged; if no, continuing to execute to the above-described marking step, until the retrieve grayscale value is greater than the maximum value of the grayscale values of the pixel blocks in the grayscale super-pixel image, to obtain the seed point super-pixel image, in which the seed points have grayscale values greater than one and grayscale values of the pixel blocks other than the seed points in the respective target regions are one.

It should be noted that, here N is an integer greater than or equal to 2, and a value of N may be set according to actual situations and actual needs, for example, the value of N may be set according to a segmentation density of super-pixel pre-segmentation, and the segmentation density may be represented by the number of pixel blocks; generally speaking, the larger the segmentation density of super-pixel pre-segmentation, the larger the value of N should be, and vice versa. Similarly, the value of the seed point grayscale threshold may also be set according to actual situations and actual needs, or the value of N may also be set according to the segmentation density of super-pixel pre-segmentation; usually, the larger the segmentation density of super-pixel pre-segmentation, the larger the value of the seed point grayscale threshold should be, and vice versa.

In the implementation mode, the pixel blocks taken as seed points in the respective targets can be obtained accurately and efficiently, while pixel blocks whose grayscale value is abnormal are rejected.

Step S151: obtaining the seed point super-pixel image.

Figure 7:
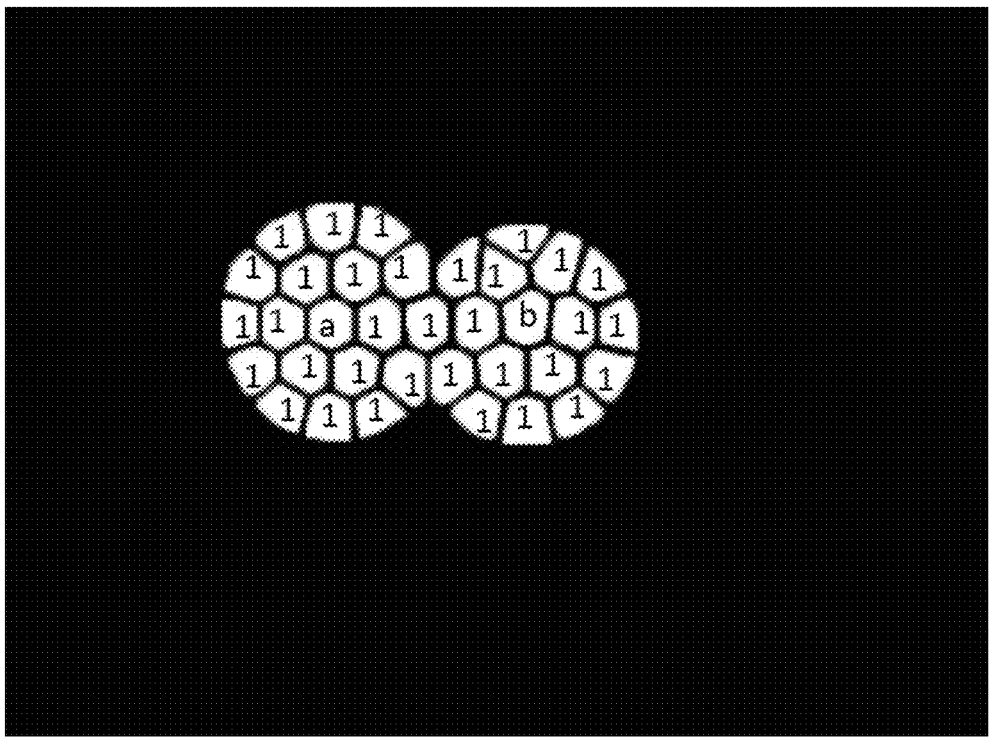
FIG. 7 is a schematic diagram of an example of a seed point super-pixel image provided by at least one embodiment of the present disclosure.

For example, seed points are marked in the grayscale super-pixel image with a uniform gradient as shown in FIG. 6, to obtain a seed point super-pixel image as shown in FIG. 7, in which the seed points have grayscale values greater than one and the grayscale values of the pixel blocks other than the seed points in respective target regions are one; and as shown in FIG. 7, a and b respectively represent the grayscale values of the two seed points.

For example, a seed point super-pixel image generation unit for acquiring the seed point super-pixel image may be provided, and the seed points are marked in the grayscale super-pixel image by the seed point super-pixel image generation unit, to obtain the seed point super-pixel image; for example, the seed point super-pixel image generation unit may be implemented by a central processing unit (CPU), a graphics processing unit (GPU), a tensor processing unit (TPU), a field programmable gate array (FPGA) or other form of processing unit having a data processing capability and/or an instruct execution capability, as well as a corresponding computer instruction.

In some implementation modes of this embodiment, before marking and filling the pixel blocks other than the seed points in the respective target regions in the seed point super-pixel image, to obtain a segmented image, in which grayscale values of pixel blocks in different target regions are the grayscale values of the seed points in the respective target regions, and boundary pixel blocks between different target regions are marked out, the image segmentation method further includes: merging seed points close to each other in the seed point super-pixel image, and updating the seed point super-pixel image.

For example, merging the seed points close to each other in the seed point super-pixel image, and updating the seed point super-pixel image, may include the following steps.

For example, the respective seed points in the seed point super-pixel image are traversed, and whether or not an N-neighborhood (e.g., an eight-neighborhood) of a current seed point includes another at least one seed point is judged.

If the N-neighborhood of the current seed point comprises another at least one seed point, that is, if the N-neighborhood of the current seed point includes another at least one seed point, a pixel block at a relatively middle position between the current seed point and the another at least one seed point is taken as a new seed point, the grayscale value of the current seed point is assigned to a grayscale value of the new seed point, the grayscale values of the current seed point and the another at least one seed point are assigned to one, and the seed point super-pixel image is updated.

For example, a pixel block located at a midpoint between the current seed point and the another at least one seed point is taken as a new seed point, a grayscale value of the new seed point is the grayscale value of the current seed point, and one is re-assigned to the grayscale values of the current seed point and the another at least one seed point.

The exemplary step may further ensure that over-segmentation is avoided.

If the N-neighborhood of the current seed point comprises no other at least one seed point, the seed point super-pixel image is not updated.

With respect to step S150, for example, in some implementation modes of some embodiments of the present disclosure, marking and filling the pixel blocks whose grayscale values are one in the seed point super-pixel image, to obtain a segmented image in which the grayscale values of the pixel blocks in different target regions are the grayscale values of the seed points in the respective target regions, and boundary pixel blocks between different target regions are marked out, may further include the following steps.

For example, the respective pixel blocks whose grayscale value is one in the seed point super-pixel image are traversed, and whether or not the N-neighborhood (e.g., the eight-neighborhood) of the current pixel block includes one seed point is judged.

Figure 8:
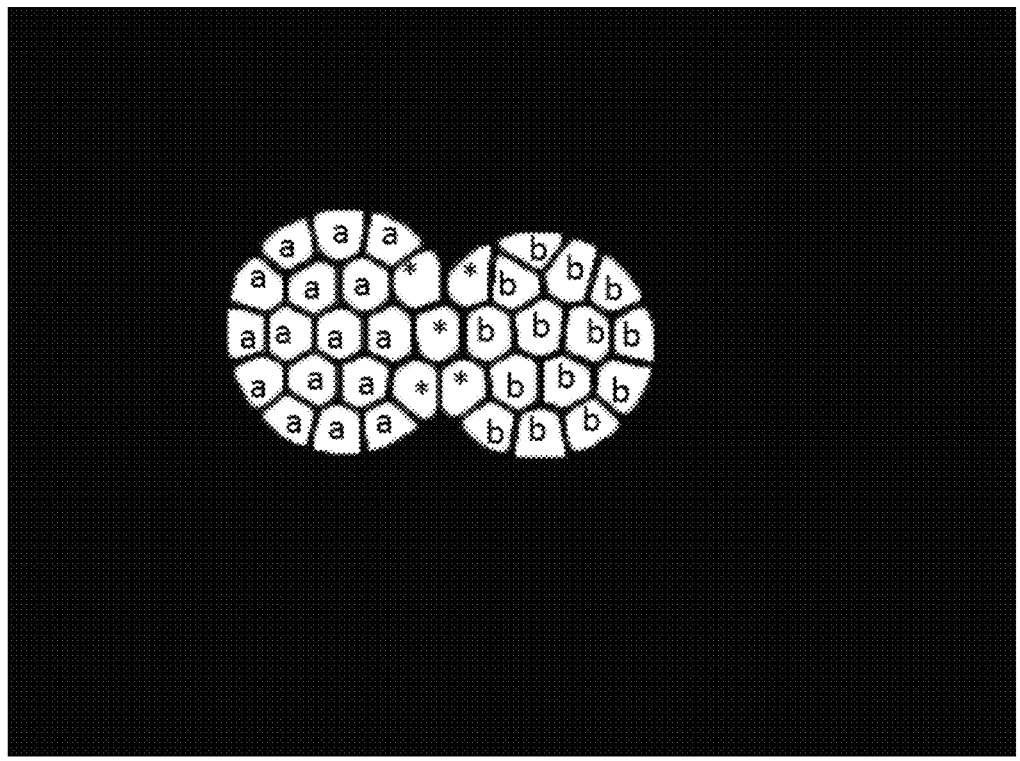
FIG. 8 is a schematic diagram of an example of a segmented image provided by at least one embodiment of the present disclosure.

If yes, that is, if the N-neighborhood of the current pixel block includes one seed point, a grayscale value of the seed point is assigned to the grayscale value of the current pixel block, so as to implement filling; if no, that is, if the N-neighborhood of the current pixel block includes a plurality of (for example, two) seed points, the current pixel block is marking as a boundary pixel block between different target regions, for example, marking as * as shown in FIG. 8.

For example, obtaining the segmented image in which the grayscale values of the pixel blocks in different target regions are the grayscale values of the seed points in the respective target regions, and the boundary pixel blocks between different target regions are marked out, after traversing all the pixel blocks whose grayscale value is one in the seed point super-pixel image. Hitherto, segmentation of the mutually adhered targets in the image is completed.

In implementation modes in some embodiments of the present disclosure, a segmented image, in which boundary pixel blocks between different target regions are marked out, can be obtained accurately and efficiently.

For example, the pixel blocks whose grayscale value is one in the seed point super-pixel image as shown in FIG. 7 are marked and filled, to obtain the segmented image in which the grayscale values of the pixel blocks in different target regions are the grayscale values of the seed points in the respective target regions, and the boundary pixel blocks between different target regions are marked out as shown in FIG. 8. In FIG. 8, a symbol * represents a boundary pixel block between different target regions that is marked out.

In some implementation modes of some embodiments of the present disclosure, after marking and filling the pixel blocks whose grayscale values are one in the seed point super-pixel image, to obtain the segmented image in which the grayscale values of the pixel blocks in different target regions are the grayscale values of the seed points in the respective target regions, and the boundary pixel blocks between different target regions are marked out, the image segmentation method further includes: marking a boundary line.

For example, the boundary line comprises the pixel points at the relatively middle position in the boundary region including the boundary pixel blocks, and the boundary line is perpendicular to a connection line between seed points of adjacent target regions.

Implementation modes of some embodiments of the present disclosure can improve the accuracy of the identification of image segmentation.

For example, a segmented image generation unit for acquiring the segmented image may be provided, and the pixel blocks whose grayscale value is one in the seed point super-pixel image are marked and filled by the segmented image generation unit, to obtain the segmented image; for example, the segmented image generation unit may be implemented by a central processing unit (CPU), a graphics processing unit (GPU), a tensor processing unit (TPU), a field programmable gate array (FPGA) or other form of processing unit having a data processing capability and/or an instruct execution capability, as well as a corresponding computer instruction.

Figure 9:
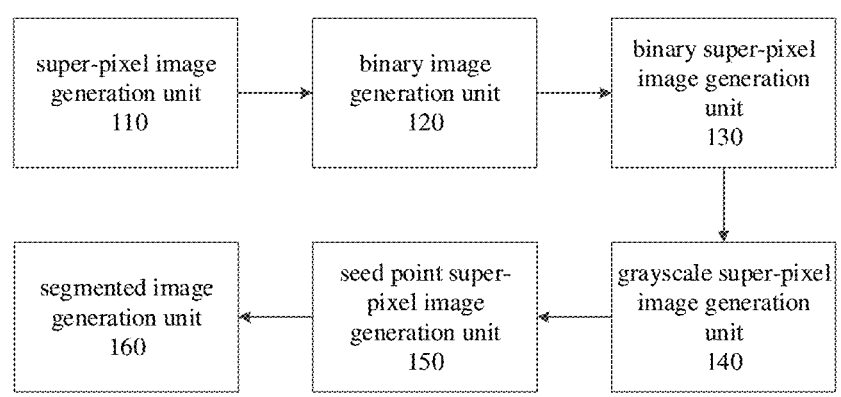
FIG. 9 is a schematic diagram of an image segmentation device provided by at least one embodiment of the present disclosure.

As shown in FIG. 9, at least one embodiment of the present disclosure further provides an image segmentation device that executes the above-described image segmentation method. For example, as shown in FIG. 9, in some examples, the image segmentation device includes a super-pixel image generation unit 110, a binary image generation unit 120, a binary super-pixel image generation unit 130, a grayscale super-pixel image generation unit 140, a seed point super-pixel image generation unit 150 and a segmented image generation unit 160. For example, these units may be implemented in a form such as a hardware (e.g., a circuit) module or a software module, and any combination thereof.

For example, the super-pixel image generation unit 110 is configured to perform super-pixel segmentation on an image to be segmented, to obtain a super-pixel image. For example, the super-pixel image generation unit 110 may implement step S110, and the related description of step S110 may be referred to for the specific implementation method thereof, which will not be repeated here.

The binary image generation unit 120 is configured to binarize the image to be segmented, to obtain a binary image whose grayscale values of pixel points in global target regions are one and grayscale values of pixel points in background regions are zero. For example, the binary image generation unit 120 may implement step S110, and the related description of step S110 may be referred to for the specific implementation method thereof, which will not be repeated here.

The binary super-pixel image generation unit 130 is configured to obtain a binary super-pixel image whose grayscale values of pixel points in global target regions are one and grayscale values of pixel points in background regions are zero, according to a ratio of a number of pixel points, grayscale values of which are one, to the number of pixel points, grayscale values of which are zero, in the binary image corresponding to a position, at which each pixel block is located, in the super-pixel image. For example, the binary super-pixel image generation unit 130 may implement step S120, and the related description of step S120 may be referred to for the specific implementation method thereof, which will not be repeated here.

The grayscale super-pixel image generation unit 140 is configured to perform distance transformation on the binary super-pixel image, to obtain a grayscale super-pixel image with a uniform gradient. For example, the grayscale super-pixel image generation unit 140 may implement step S130, and the related description of step S130 may be referred to for the specific implementation method thereof, which will not be repeated here.

The seed point super-pixel image generation unit 150 is configured to mark seed points in the grayscale super-pixel image, to obtain a seed point super-pixel image in which grayscale values of the seed points are greater than one and grayscale values of pixel blocks other than the seed points in target regions are one. For example, the seed point super-pixel image generation unit 150 may implement step S140, and related description of step S140 may be referred to for the specific implementation method thereof, which will not be repeated here.

The segmented image generation unit 160 is configured to mark and fill the pixel blocks, grayscale values of which are one, in the seed point super-pixel image, to obtain a segmented image, in which grayscale values of pixel blocks in different target regions are grayscale values of seed points in respective target regions, and boundary pixel blocks between different target regions are marked out. For example, the segmented image generation unit 160 may implement step S150, and the related description of step S150 may be referred to for the specific implementation method thereof, which will not be repeated here.

It should be noted that, the image segmentation device provided by the embodiment of the present disclosure may include more or fewer circuits or units, and a connection relationship between respective circuits or units will not be limited, which may be determined according to actual needs. A specific mode for constituting the respective circuits will not be limited, which may be constituted by an analog device according to principles of circuits, or may also be constituted by a digital chip, or constituted in other applicable mode.

It should be noted that, a principle and a working process of the image segmentation device provided by this embodiment are similar to those of the above-described image segmentation method, and the above description may be referred to for related contents, which will not be repeated here.

Figure 10:
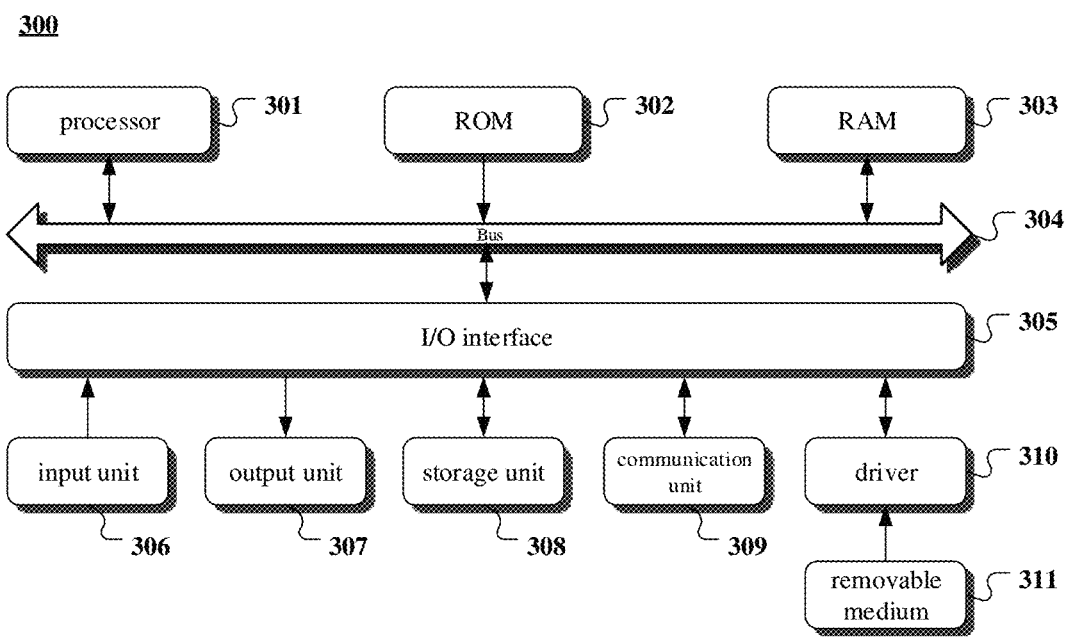
FIG. 10 shows a structural schematic diagram of a computer system configured to implement an image segmentation device provided by at least one embodiment of the present disclosure.

As shown in FIG. 10, a computer system 300 configured to implement an image segmentation device provided by at least one embodiment of the present disclosure includes a processor 301 and a memory (not shown, which, for example, includes a read only memory (ROM) 302, a random access memory (RAM) 303 and a storage unit 308).

For example, the processor 301 may be a central processing unit (CPU), a graphics processing unit (GPU), or other form of processing unit having a data processing capability and/or an instruct execution capability, which may be a general purpose processor or a special purpose processor, and may control other components in the image segmentation device to execute a desired function. For example, hereinafter, the processor 301 is a CPU, which is taken as an example, which will not be limited in the embodiment of the present disclosure.

For example, the processor 301 may execute various appropriate actions and processes according to a program stored in the read only memory (ROM) 302 or a program loaded from a storage portion to the random access memory (RAM) 303. The RAM 303 is also stored with various programs and data required for computer system operation. The CPU, the ROM 302 and the RAM 303 are connected with each other through a bus 304. For example, an input/output (I/O) interface 305 is also coupled to the bus 304. For example, the bus 304 may be a serial or parallel communication bus, etc., which will not be limited in the embodiment of the present disclosure.

For example, the memory is used for storing one or more computer program modules, and the one or more computer program modules are configured to be executed by the processor 301. For example, the one or more computer program modules include instructions for executing an image segmentation method provided by any one embodiment of the present disclosure. The computer program product may include various forms of computer readable storage media, for example, a volatile memory and/or a non-volatile memory. The volatile memory may include, for example, a random access memory (RAM) and/or a cache, and the like. The non-volatile memory may include, for example, a read only memory (ROM), a hard disk, a flash memory, and the like. One or more computer program instructions may be stored on the computer readable storage medium, and the processor 201 may run the program instructions to implement the functions (implemented by the processor 210) and/or other desired functions, for example, the image segmentation method, etc., according to the embodiments of the present disclosure. Various application programs and various data, for example, a seed point grayscale threshold, as well as various data used and/or generated by the application programs, etc., may also be stored in the computer readable storage medium.

For example, the computer system 300 further includes components below, each coupled to the I/O interface 305: an input unit 306 including a keyboard and a mouse, etc.; an output unit 307 including a liquid crystal display (LCD) and a speaker, etc.; a storage unit 308 including a hard disk, etc.; and a communication unit 309 including a network interface card such as a LAN card and a modem. The communication unit 309 executes communication processing via a network such as the Internet. A driver 310 is also coupled to the I/O interface 305 according to needs. A removable medium 311 such as a magnetic disk, an optical disk, a magneto-optical disk and a semiconductor memory is mounted on the driver 310 according to needs, so that a computer program read from the removable medium 311 is installed into the storage portion according to needs.

For example, according to some embodiments of the present disclosure, the processes described in the flow charts as shown in FIG. 1A to FIG. 1C may be implemented as a computer software program. For example, the embodiment includes a computer program product, including a computer program tangibly embodied on a computer readable medium, and the above-described computer program including a program code for executing the method illustrated by the flow charts. In such an embodiment, the computer program may be downloaded and installed from a network through the communication unit 309, and/or installed from the removable medium 311.

The flow charts and the schematic diagrams in the drawings illustrate architectures, functions and operations that may be implemented according to the system, the method and the computer program products according to this embodiment. In this regard, each block in the flow charts and the schematic diagrams may represent a portion of a module, a program segment, or a code. The portion of the module, the program segment, or the code includes one or more executable instructions for implementing a specified logical function. It should be noted that, in some alternative implementations, the functions denoted in the blocks may also occur in a sequence different from the sequences as shown in the drawings. For example, in practice, two blocks in succession may be executed, depending on the involved functionalities, substantially in parallel, or in a reverse sequence. It should also be noted that, each block in the schematic diagrams and/or the flow charts, as well as a combination of the blocks in the schematic diagrams and/or the flow charts may be implemented by a dedicated system, based on hardware, executing specific functions or operations, or by a combination of dedicated hardware and computer instructions.

The involved units as described in this embodiment may be implemented by software, or may also be implemented by hardware. The described unit may also be provided in the processor, which, for example, may be described as: a processor, including a super-pixel image generation unit, a binary image generation unit, a binary super-pixel image generation unit, a grayscale super-pixel image generation unit, a seed point super-pixel image generation unit and a segmented image generation unit. For example, names of these units do not constitute a limitation on the units in some cases. For example, the segmented image generation unit may also be described as an "image segmenting unit".

For example, some embodiments of the present disclosure further provide a non-volatile storage medium, the non-volatile storage medium may be the non-volatile storage medium included in the above-described device according to the foregoing embodiment, or may also be a non-volatile storage medium that exists alone, and is not assembled into a terminal. The above-described non-volatile storage medium is stored with one or more programs, and when the above-described one or more programs are executed by an device, the above-described device may be enabled to execute the steps.

Super-pixel pre-segmentation is performed on an image to be segmented to obtain a super-pixel image, and binarization is performed on the image to be segmented to obtain a binary image, grayscale values of pixel points in global target regions of which are one and grayscale values of pixel points in background regions of which are zero.

A binary super-pixel image, grayscale values of pixel points in global target regions of which are one and grayscale values of pixel points in background regions of which are zero, is obtained, according to a ratio of a number of pixel points, grayscale values of which are one, to a number of pixel points, grayscale values of which are zero, in the binary image corresponding to a position, at which each pixel block is located, in the super-pixel image;

Distance transformation is performed on the binary super-pixel image to obtain a grayscale super-pixel image with a uniform gradient.

Seed points are marked in the grayscale super-pixel image, to obtain a seed point super-pixel image in which grayscale values of seed points are greater than one and grayscale values of pixel blocks other than the seed points in global target regions are one.

Pixel blocks, whose grayscale values are one, are marked and filled in the seed point super-pixel image, to obtain a segmented image in which grayscale values of pixel blocks in different target regions are grayscale values of seed points in respective target regions, and boundary pixel blocks between different target regions are marked out.

For example, the storage medium may be any combination of one or more computer readable storage media; for example, one computer readable storage medium includes a computer readable program code for performing super-pixel segmentation on the image to be segmented to obtain the super-pixel image, the super-pixel image includes at least one pixel block, and another computer readable storage medium includes a computer readable program code for marking and filling the pixel blocks whose grayscale values are a first value in the seed point super-pixel image, to obtain the segmented image. For example, in a case where the program code is read by a computer, the computer may execute the program code stored in the computer storage medium, to execute, for example, an image segmentation method provided by any one embodiment of the present disclosure.

For example, the storage media may include a memory card of a smart phone, a storage component of a tablet, a hard disk of a personal computer, a random access memory (RAM), a read-only memory (ROM), a erasable programmable read-only memory (EPROM), a portable compact disk read-only memory (CD-ROM), a flash memory, or any combination of the above-mentioned storage media, or other suitable storage media.

The following should be noted:

(1) Only the structures involved in the embodiments of the present disclosure are illustrated in the drawings of the embodiments of the present disclosure, and other structures can refer to usual designs.

(2) The embodiments and features in the embodiments of the present disclosure may be combined in case of no conflict to obtain new embodiments.

The foregoing merely are exemplary embodiments of the disclosure, and not intended to define the scope of the disclosure, and the scope of the disclosure is determined by the appended claims.

What is claimed is:

1. An image segmentation method, comprising:
   performing super-pixel segmentation on an image to be segmented to obtain a super-pixel image comprising at least one pixel block, and binarizing the image to be segmented to obtain a binary image;
   obtaining a binary super-pixel image according to a ratio of a number of pixel points, grayscale values of which are a first value, to a number of pixel points, grayscale values of which are a second value, in the binary image corresponding to a position, at which each pixel block is located, in the super-pixel image;
   performing distance transformation on the binary super-pixel image, to obtain a grayscale super-pixel image;
   marking seed points in the grayscale super-pixel image, to obtain a seed point super-pixel image, wherein grayscale values of the seed points in the seed point super-pixel image are greater than the first value, and grayscale values of pixel blocks other than the seed points in target regions are the first value; and
   marking and filling the pixel blocks, grayscale values of which are the first value, in the seed point super-pixel image, to obtain a segmented image.

2. The image segmentation method according to claim 1, wherein grayscale values of pixel blocks in different target regions of the segmented image are grayscale values of seed points in respective target regions, and boundary pixel blocks between different target regions are marked out in the segmented image.

3. The image segmentation method according to claim 2, wherein a grayscale value of a pixel point in a target region of the binary image is the first value, and a grayscale value of a pixel point in a background region of the binary image is the second value.

4. The image segmentation method according to claim 3, wherein a grayscale value of a pixel point in a target region of the binary super-pixel image is the first value, and a grayscale value of a pixel point in a background region of the binary super-pixel image is the second value.

5. The image segmentation method according to claim 4, wherein the first value is one, and the second value is zero.

6. The image segmentation method according to claim 4, wherein performing distance transformation on the binary super-pixel image to obtain the grayscale super-pixel image comprises:
   setting an initial grayscale image corresponding to positions of pixel blocks in the binary super-pixel image, wherein initial grayscale values of respective pixel blocks in the initial grayscale image are the second value;
   traversing the respective pixel blocks in the binary super-pixel image, and judging whether or not a grayscale value of a current pixel block is the second value;
   if the grayscale value of the current pixel block is not the second value, judging whether or not a grayscale value of at least one pixel block, among pixel blocks adjacent to the current pixel block, is the second value;

if the grayscale value of at least one pixel block, among the pixel blocks adjacent to the current pixel block, is the second value, assigning the second value to the grayscale value of pixel block, corresponding to the current pixel block, in the initial grayscale image, and adding one to grayscale values of pixel blocks, corresponding to the pixel blocks adjacent to the current pixel block, in the initial grayscale image; and if the grayscale value of the current pixel block is the second value, continuing to traverse, until all the pixel blocks in the binary super-pixel image are traversed, and thus obtaining the grayscale super-pixel image.

7. The image segmentation method according to claim 6, wherein marking seed points in the grayscale super-pixel image, to obtain the seed point super-pixel image, comprises:

setting an initial seed point image corresponding to positions of pixel blocks in the grayscale super-pixel image, wherein initial grayscale values of pixel blocks of the initial seed point image are the second value;

acquiring a maximum value in grayscale values of respective pixel blocks in the grayscale super-pixel image, setting a seed point grayscale threshold, and setting an initial value i to a retrieve grayscale value, where i is an integer greater than or equal to the first value;

executing a marking step comprising: starting traversing from a pixel block, a grayscale value of which is the retrieve grayscale value in the grayscale super-pixel image, and judging whether or not a sum of grayscale values of pixel blocks within an N-neighborhood of the current pixel block in the grayscale super-pixel image is the second value;

if the sum of the grayscale values of the pixel blocks within the N-neighborhood of the current pixel block in the grayscale super-pixel image is the second value, assigning the second value to a grayscale value of a pixel block, corresponding to the current pixel block of the grayscale super-pixel image, in the initial seed point image;

if the sum of the grayscale values of the pixel blocks within the N-neighborhood of the current pixel block in the grayscale super-pixel image is not the second value, judging whether or not the sum of the grayscale values of the pixel blocks within the N-neighborhood of the current pixel block is greater than or equal to the seed point grayscale threshold;

if the sum of the grayscale values of the pixel blocks within the N-neighborhood of the current pixel block is greater than or equal to the seed point grayscale threshold, taking the pixel block, corresponding to the current pixel block of the grayscale super-pixel image, in the initial seed point image as a seed point and assigning a grayscale value of the current pixel block to a grayscale value of the seed point;

if the sum of the grayscale values of the pixel blocks within the N-neighborhood of the current pixel block is not greater than or equal to the seed point grayscale threshold, assigning the first value to the grayscale value of the pixel block, corresponding to the current pixel block of the grayscale super-pixel image, in the initial seed point image; and adding one to the retrieve grayscale value, continuing to execute the marking step, until the retrieve grayscale value is greater than the maximum value in the grayscale values of the respective pixel blocks in the grayscale super-pixel image, and thus obtaining the seed point super-pixel image, wherein the N-neighborhood is a neighborhood comprises pixel blocks, adjacent to the current pixel block, and pixel blocks, separated from the current pixel block by 1 to N−1 pixel blocks, and N is an integer greater than or equal to 2.

8. The image segmentation method according to claim 7, before marking and filling the pixel blocks, the grayscale value of which are the first value in the seed point super-pixel image, to obtain the segmented image, further comprising:

merging seed points close to each other in the seed point super-pixel image, and updating the seed point super-pixel image.

9. The image segmentation method according to claim 8, wherein merging the seed points close to each other in the seed point super-pixel image, and updating the seed point super-pixel image comprises:

traversing respective seed points in the seed point super-pixel image, and judging whether or not an N-neighborhood of a current seed point comprises another at least one seed point;

if the N-neighborhood of the current seed point comprises another at least one seed point, taking a pixel block at a relatively middle position between the current seed point and the another at least one seed point as a new seed point, assigning a grayscale value of the current seed point to a grayscale value of the new seed point, assigning the first value to the grayscale value of the current seed point and the grayscale value of the another at least one seed point, and thus updating the seed point super-pixel image; and if the N-neighborhood of the current seed point comprises no other at least one seed point, not updating the seed point super-pixel image.

10. The image segmentation method according to claim 7, wherein marking and filling the pixel blocks, grayscale values of which are the first value, in the seed point super-pixel image, to obtain the segmented image, comprises:

traversing respective pixel blocks, grayscale values of which are the first value, in the seed point super-pixel image, and judging whether or not the N-neighborhood of the current pixel block comprises one seed point;

if the N-neighborhood of the current pixel block comprises one seed point, assigning a grayscale value of the seed point to the grayscale value of the current pixel block, to implement filling;

if the N-neighborhood of the current pixel block comprises more than one seed point, in a case where the N-neighborhood of the current pixel block comprises a plurality of seed points, marking the current pixel block as a boundary pixel block between different target regions; and obtaining the segmented image, after traversing all the pixel blocks, grayscale values of which are the first value, in the seed point super-pixel image.

11. The image segmentation method according to claim 10, after marking and filling the pixel blocks, grayscale values of which are the first value, in the seed point super-pixel image, to obtain the segmented image, further comprising:

marking a boundary line, wherein the boundary line comprises pixel points at a relatively middle position in a boundary region comprising the boundary pixel block, and the boundary line is perpendicular to a connection line between seed points of adjacent target regions.

12. The image segmentation method according to claim 4, wherein obtaining the binary super-pixel image according to the ratio of the number of pixel points, the grayscale values of which are the first value, to the number of pixel points, the grayscale value of which are the second value, in the binary image corresponding to the position, at which each pixel block is located, in the super-pixel image, comprises:

traversing the respective pixel blocks in the super-pixel image, and judging whether or not the ratio of the number of pixel points, grayscale values of which are the first value, to the number of pixel points, grayscale values of which are the second value, in the binary image corresponding to a position, at which the current pixel block is located, in the super-pixel image, is greater than or equal to one;

if the ratio of the number of the pixel points, the grayscale values of which are the first value, to the number of the pixel points, the grayscale values of which are the second value, in the binary image corresponding to the position, at which the current pixel block is located, in the super-pixel image, is greater than or equal to one, assigning the first value to grayscale value of the current pixel block;

if the ratio of the number of pixel points, grayscale values of which are the first value, to the number of pixel points, grayscale values of which are the second value, in the binary image corresponding to the position, at which the current pixel block is located, in the super-pixel image, is not greater than or equal to one, assigning the second value to the grayscale value of the current pixel block; and traversing all the pixel blocks in the super-pixel image, and thus obtaining the binary super-pixel image.

13. A computer device, comprising:
a processor; and
a memory, wherein one or more computer program modules are stored on the memory,
wherein the one or more computer program modules are configured to be executed by the processor, and the one or more computer program modules comprise instructions for executing the image segmentation method according to claim 1.

14. A non-transitory non-volatile storage medium, for storing a computer readable instructor, and executing the image segmentation method according to claim 1 in a case where the computer readable instruction is executed by a computer.

15. An image segmentation device, comprising:
a super-pixel image generation unit, configured to perform super-pixel segmentation on an image to be segmented to obtain a super-pixel image comprising at least one pixel block;
a binary image generation unit, configured to binarize the image to be segmented to obtain a binary image;
a binary super-pixel image generation unit, configured to obtain a binary super-pixel image according to a ratio of the number of pixel points, grayscale values of which are a first value, to the number of pixel points, grayscale values of which is a second value, in the binary image corresponding to a position, at which each pixel block is located, in the super-pixel image;
a grayscale super-pixel image generation unit, configured to perform distance transformation on the binary super-pixel image, to obtain a grayscale super-pixel image;
a seed point super-pixel image generation unit, configured to mark seed points in the grayscale super-pixel image, to obtain a seed point super-pixel image, wherein grayscale values of the seed points in the seed point super-pixel image are greater than the first value, and grayscale values of pixel blocks other than the seed points in target regions is the first value; and
a segmented image generation unit, configured to mark and fill the pixel blocks, grayscale values of which are the first value in the seed point super-pixel image, to obtain a segmented image.

16. The image segmentation device according to claim 15, wherein grayscale values of pixel blocks in different target regions of the segmented image are grayscale values of seed points in respective target regions, and boundary pixel blocks between different target regions are marked out in the segmented image.

17. The image segmentation device according to claim 15, wherein a grayscale value of a pixel point in a target region of the binary image is the first value, and a grayscale value of a pixel point in a background region of the binary image is the second value.

18. The image segmentation device according to claim 15, wherein a grayscale value of a pixel point in a target region of the binary super-pixel image is the first value, and a grayscale value of a pixel point in a background region of the binary super-pixel image is the second value.

19. The image segmentation device according to claim 15, wherein the first value is one, and the second value is zero.

\* \* \* \* \*